(12) United States Patent
Tacke et al.

(10) Patent No.: US 11,700,793 B2
(45) Date of Patent: Jul. 18, 2023

(54) BALER ROTOR FEEDING APPARATUS

(71) Applicant: DEERE & COMPANY, Moline, IL (US)

(72) Inventors: Kevin M. Tacke, Oskaloosa, IA (US); Robert J. Naeger, Ottumwa, IA (US); Charles S. Sloan, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 591 days.

(21) Appl. No.: 16/220,440

(22) Filed: Dec. 14, 2018

(65) Prior Publication Data

US 2020/0187423 A1 Jun. 18, 2020

(51) Int. Cl.
*A01F 15/10* (2006.01)

(52) U.S. Cl.
CPC ...... *A01F 15/101* (2013.01); *A01F 2015/102* (2013.01)

(58) Field of Classification Search
CPC .............. A01F 15/101; A01F 2015/102; A01F 2015/108; A01F 15/10; A01F 2015/107
See application file for complete search history.

(56) References Cited

U.S. PATENT DOCUMENTS

| | | | | |
|---|---|---|---|---|
| 4,525,991 A * | 7/1985 | Naaktgeboren | ........ | A01D 90/02 100/189 |
| 4,644,862 A * | 2/1987 | Young | ................... | A01F 15/101 100/189 |
| 5,848,523 A | 12/1998 | Engel et al. | | |
| 6,279,304 B1 * | 8/2001 | Anstey | ................... | A01F 15/106 198/676 |
| 6,298,646 B1 * | 10/2001 | Schrag | ................... | A01F 15/101 100/88 |
| 6,601,375 B1 * | 8/2003 | Grahl | ................... | A01D 89/006 56/16.6 |
| 8,056,314 B1 | 11/2011 | Anstey et al. | | |

(Continued)

FOREIGN PATENT DOCUMENTS

| | | |
|---|---|---|
| CN | 203473799 U | 3/2014 |
| CN | 205993146 U | 3/2017 |

(Continued)

OTHER PUBLICATIONS

Spacer. http://www.couplinganswers.com/2015/08/what-is-difference-between-spacer-vs.html.*

(Continued)

*Primary Examiner* — Shelley M Self
*Assistant Examiner* — Mohammed S. Alawadi
(74) *Attorney, Agent, or Firm* — Taft Stettinius & Hollister LLP; Stephen F. Rost

(57) ABSTRACT

A rotor assembly that has a support tube having a first diameter, at least one tooth coupled to the support tube, wherein the tooth rotates with the support tube to direct crop toward a chamber, and an undershot auger having an auger flight extending radially away from an auger core, the auger flight configured to cause the crop to flow towards a bale chamber region of the rotor assembly when rotation of the rotor assembly causes the crop to flow under the rotor assembly. Wherein, the auger core has a second diameter that is greater than the first diameter.

14 Claims, 8 Drawing Sheets

(56) References Cited

U.S. PATENT DOCUMENTS

| | | | | |
|---|---|---|---|---|
| 2002/0029553 A1* | 3/2002 | Schrag | ............... | A01F 15/101 |
| | | | | 56/60 |
| 2010/0071339 A1* | 3/2010 | Viaud | ................ | A01D 90/04 |
| | | | | 56/341 |
| 2015/0373911 A1* | 12/2015 | Weyne | ............... | A01F 15/042 |
| | | | | 56/341 |
| 2018/0070532 A1* | 3/2018 | Rittershofer | ....... | A01D 41/1243 |

FOREIGN PATENT DOCUMENTS

| | | |
|---|---|---|
| DE | 19806630 A1 | 8/1999 |
| EP | 2168427 A1 | 3/2010 |
| EP | 2387872 A1 | 11/2011 |

OTHER PUBLICATIONS 460R and 560 R Round Balers Operation Manual, John Deere, Issue K7, 348 pages, 2017.
European Search Report issued in counterpart application No. 19210406.5 dated Sep. 1, 2020 (11 pages).

* cited by examiner

BALER ROTOR FEEDING APPARATUS

FIELD OF THE DISCLOSURE

The present disclosure relates to an undershot rotary feeding assembly and more specifically to an undershot rotary feeding assembly that utilizes augers with an enlarged auger core to direct crop towards a portion of the rotary feeding assembly.

BACKGROUND

Bales of crop are typically formed by a tractor drawn harvesting machine including, near its leading edge, a pickup device in the form of a rotor having a plurality of outwardly extending tines. Rotor rotation serves to pick the crop upwardly over the rotor and rearwardly relative to a direction of travel for further processing. A comb-like array of fixed elements strip the crop from the tines at an appropriate location to prevent the crop from being returned to the ground. A pickup or take-up device with a wide swath is desirable to minimize the number of harvester passes necessary to clear a field, however, directly feeding the crop from such a wide swath to a baling chamber would result in an inordinately long and difficult to handle bales. Some type of converging arrangement for narrowing the width of the crop entering the baling chamber is typically employed to minimize the bale width.

Known large round balers and rectangular balers receive the crop to be baled from a take-up device of great width that delivers it to a transverse conveyor, such as a screw conveyor, that conducts it in turn selectively into a cutter head from which it reaches a baling chamber or a pre-compression chamber. In these balers, condensed and compressed crop to be baled can bring about jams in the cutter head.

Undershot rotary feeding assemblies often utilize augers on either end to move crop toward a central region of the feeding assembly to be further processed by teeth or the like before becoming positioned in a pre-compression chamber or a bale chamber. In this configuration, the augers may become clogged with crop material under certain field conditions. Further, if the augers fail to properly move crop to the central region, the crop may become compressed between the augers and the surrounding housing to bind the rotary feeding assembly. Further still, if the augers move crop towards the central region to quickly, the crop may be unevenly distributed in the bale chamber or pre-compression chamber and create an uneven bale.

Accordingly, there is a need for an undershot rotary feeding assembly that reduces the occurrence of clogged crop material and evenly distributes crop along the central region of the baler.

SUMMARY

One embodiment is a rotor assembly that has a support tube having a first diameter, at least one tooth coupled to the support tube, wherein the tooth rotates with the support tube to direct crop toward a chamber, and an undershot auger having an auger flight extending radially away from an auger core, the auger flight configured to cause the crop to flow towards a bale chamber region of the rotor assembly when rotation of the rotor assembly causes the crop to flow under the rotor assembly. Wherein, the auger core has a second diameter that is greater than the first diameter.

One example includes a rotor floor defining a floor plane, a first choke distance defined between the floor plane and the auger core, and a second choke distance defined between the support tube and the floor plane. Wherein, the first choke distance is less than the second choke distance. In another example the auger has a lifter plate extending from the auger core.

Another embodiment is a crop management system for an agricultural work machine that has a rotor assembly having a first auger coupled to a support tube, a plurality of teeth coupled to the support tube along a bale chamber region, a rotor floor positioned along a portion of the rotor assembly, and a first auger core of the first auger coupled to the support tube. Wherein, the rotor assembly rotates in an undershot direction wherein a leading portion of the rotor assembly is rotating partially toward the rotor floor. Further wherein, an auger choke distance is defined as the distance between the first auger core and a floor plane. Further wherein, a support tube distance is defined between the support tube and the floor plane and the auger choke distance is less than the support tube distance.

One example of this embodiment includes a second auger having a second auger core that is spaced the auger choke distance from the floor plane. In one aspect of this example, both the first and second auger have flighting extending from the corresponding auger core to reposition crop towards the bale chamber region. In another aspect of this example, the first and second augers each have a lifter plate extending from the corresponding auger core. In another example, the first auger core has a diameter that is greater than a support tube diameter of the support tube. In yet another example, the auger core is coupled to the support tube with an auger coupler spacer, wherein the auger coupler spacer radially and axially aligns the auger core with the support tube. One aspect of this example includes a coupler portion extending inwardly from an inner surface of the auger core, wherein the coupler portion is coupled to the auger coupler spacer of the support tube to couple the auger core to the support tube. Part of this aspect may include an auger spacer positioned between the auger core and the support tube, wherein the auger spacer maintains radial orientation of the auger core relative to the support tube but is not coupled to the auger core.

Another embodiment is a method for processing crop in a baler assembly that includes providing at least one auger assembly, a support tube assembly, a teeth arrangement, a rotor floor, a crop pickup, and a rotor drive system, coupling the teeth arrangement to the support tube assembly along a bale chamber region, coupling the at least one auger assembly to the support tube, positioning the support tube so the at least one auger assembly is an auger choke distance from a floor plane of the rotor floor and the support tube is a support tube choke distance from the floor plane, the support tube choke distance being greater than the auger choke distance, and coupling the support tube to the rotor drive system to selectively rotate the support tube, at least one auger, and teeth arrangement at an operation speed in an undershot direction. Wherein, the at least one auger assembly has fighting at a pitch there around.

In one example of this embodiment, the coupling the at least one auger assembly step includes positioning the at least one auger at least partially around the support tube. One aspect of this example includes positioning the support tube and at least one auger adjacent to a pickup, wherein the pickup moves a crop material from an underlying surface along a crop flow path that leads between the support tube and the rotor floor. In one part of this aspect, the crop flow path leads to a bale chamber of a round baler. In a different part of this aspect, the crop flow path leads to a pre-compression chamber of a rectangular baler.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
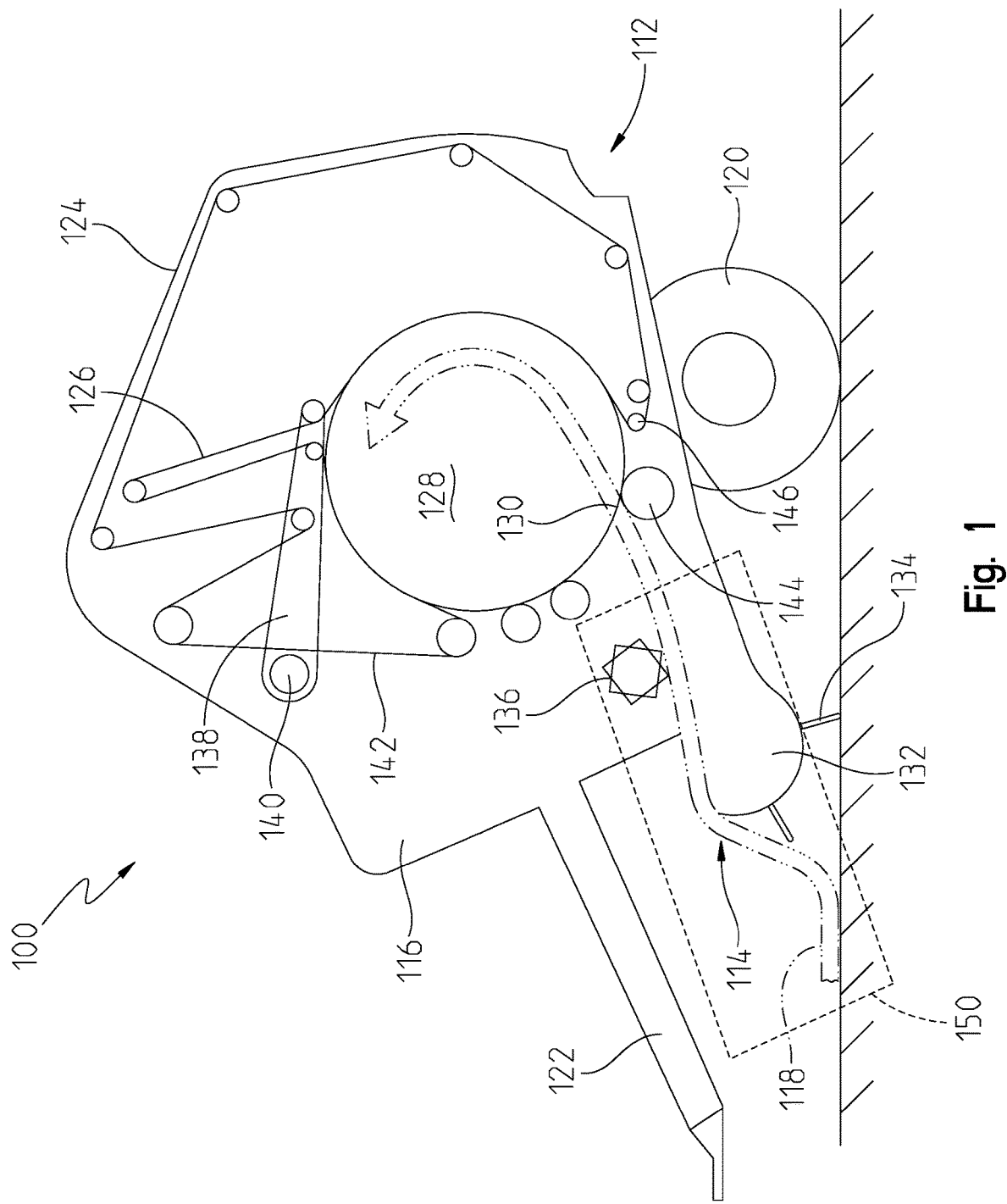
FIG. 1 is a side view of a round baler.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring to FIG. 1, there is shown a baler 100 having a chassis 112 and a pickup assembly 150. The pickup assembly 150 may have a crop supply assembly 114 among other things. The baler 100 is configured as a large round baler, however, this disclosure equally applies to rectangular balers as well. The baler 100 is applied on the field and takes up crop 118 deposited on the ground in wide swaths, in order to subject it to a baling process. In the case of a large round baler, a configuration with a baling chamber of fixed size as well as a chamber of variable size can be considered. In the case of a rectangular baler, a pre-compression chamber may compile crop prior to being compressed by a plunger. The chassis 112 includes a frame 116 supported on wheels 120, a tow bar 122, side walls 124, and a baling arrangement 126. An axle forms the connection between the wheels 120 and the frame 116 and can be attached or configured as spring-supported or rigid.

The wheels support the frame 116 on the ground so that it can move freely and be drawn across the field by the tow bar 122 due to its connection with a towing vehicle or other work machine. The side walls 124 are spaced away from each other by the width of, and define opposite sides of, the baling chamber 128. The baling arrangement 126 may consist of belts, pulleys, bar chains or the like, and is used to take up the crop to be baled and conducted in the baling chamber 128 and to compress it. An inlet 130 into the baling chamber 128 is provided at the forward lower end region of the baling arrangement 126. The pickup assembly 150 is composed of components that are located upstream of the inlet 130 and includes a take-up device 132. As crop is fed in, the bale expands and arm 138 pivots about 140 correspondingly increasing the portion of belt 142 surrounding the bale. The take-up device 132 is provided with tines 134 that raise the crop 118 to be baled from the ground and deliver it to the rear to the crop processing arrangement 136. The floor roller 144 is a tube and may be in front of a lower gate roller 146.

Figure 2:
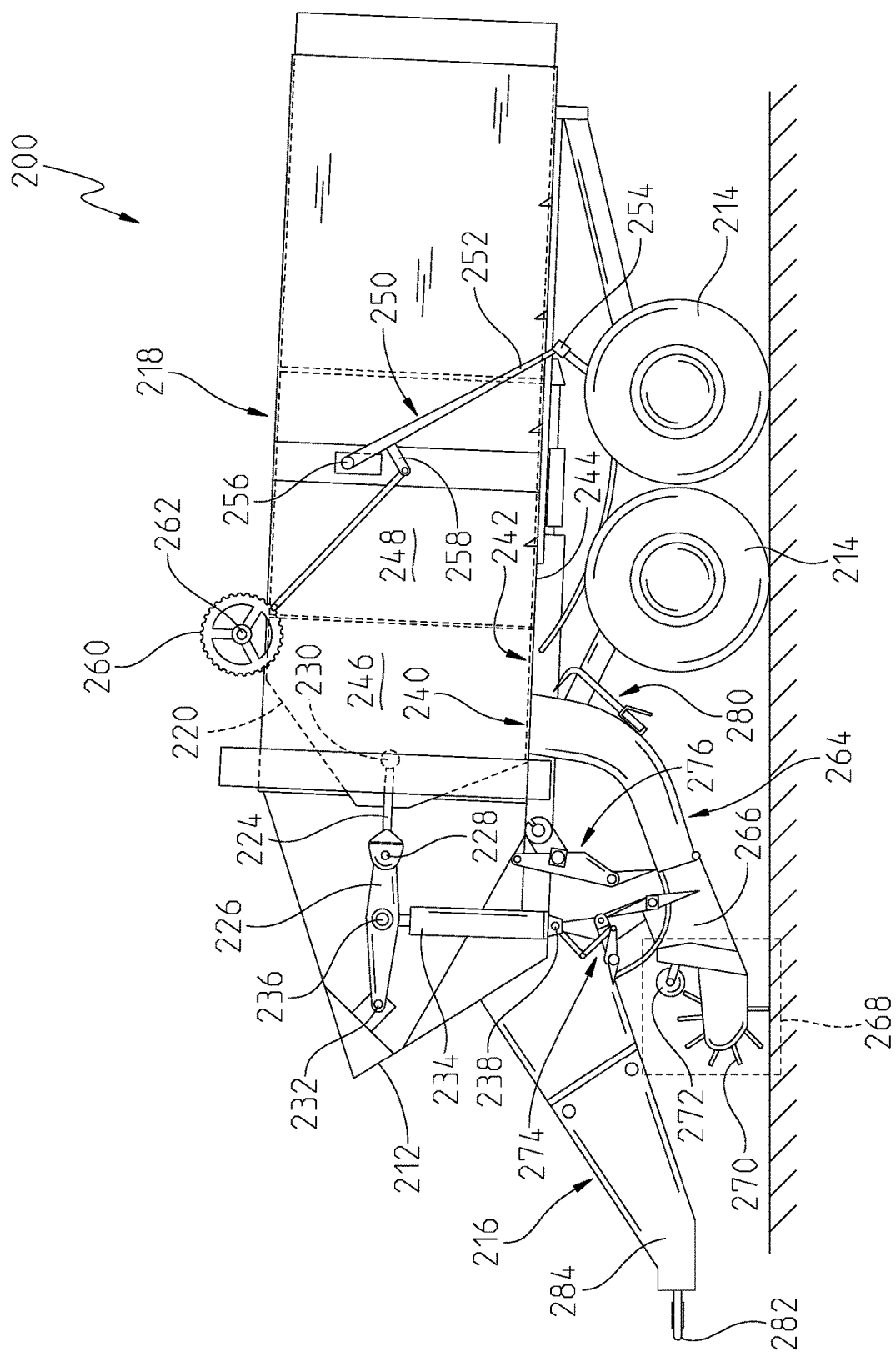
FIG. 2 is a side view of a rectangular baler.

Referring now to FIG. 2, a large rectangular baler 200 includes a main frame 212 supported on wheels 214 for being towed over the ground by a tractor or other work machine coupled to a forward end of a draft tongue 216, which is fixed to a forward end of the frame 212. A longitudinally extending baling chamber 218, of rectangular or square cross-section, is supported centrally on the frame 212 at an elevation above the sets of wheels 214.

A plunger head 220 is mounted in a forward section of the chamber 218 for being reciprocated through the action of a toggle linkage defined by a pair of transversely spaced first links 224 and a second link or crank arm 226. The links 224 and 226 are pivotally coupled to each other at a pivotal connection 228, with the pair of first links 224 being pivotally coupled to the plunger head 220 at respective pins 230, and with the second link 226 being coupled to the frame 212, as at a pin 232. A hydraulic plunger head drive cylinder 234 is provided for toggling the links 224 and 226, and for this purpose has a rod end coupled, as at a pin 236, to a location of the link 226. The link 226 is between the pivotal connections 232 and 228, and has a rod end coupled to the frame 212, as at pivot pin 238.

When the drive cylinder 234 is fully retracted, as shown in FIG. 2, the plunger head 220 is fully extended to the rear, with the pins 230 and 232 being located such that they lie along a longitudinal central axis of the baling chamber 218. Extension of the cylinder 234 will cause the link 226 to be pivoted upwardly about the pin 232 resulting in the plunger head 220 being retracted to the extent that it uncovers a crop material inlet 240 extending entirely across a region located just in front of a stationary knife provided across a forward end 242 of a bottom wall or floor 244 of the baling chamber 218.

The baling chamber 218 includes a front section 246 of fixed cross section which is joined to a rear section 248, of variable cross section, having opposite side panels which are respectively mounted for swinging horizontally about vertical hinges provided at their forward ends. A twine tying arrangement is provided for wrapping and tying multiple loops of twine about a completed bale. A needle yoke arrangement 250, including opposite arms 252, is joined by a cross tube 254. The needle yoke arrangement 250 is mounted for vertical pivotal movement about a horizontal transverse axis defined by pivotal connections 256 that connect respective ends of the arms 252 to opposite side locations of rear regions of the fixed front baling chamber section 246.

A plurality of curved, twine delivery needles, equal in number to the knotter drive gears, are respectively fixed to transversely spaced locations of the cross tube 254. A crank arm is provided at each of opposite ends of the knotter shaft and is pivotally connected between each crank arm and a coupler 258 fixed to each needle yoke arm 252, at a location close to the pivotal connection 256, is a connecting rod.

The bale tying cycle is initiated by a bale length sensor arrangement including a toothed metering wheel 260 mounted on a shaft 262 extending horizontally across and being rotatably mounted to the top of the baling chamber 218. The metering wheel 260 has a toothed periphery which extends into the baling chamber 218 and is contacted by a forming bale so as to be rotated as the bale grows in length. The rotation of the metering wheel 260 is sensed and converted into a signal representing bale length, with a control signal being sent to initiate the tying cycle when the forming bale reaches a length corresponding to a desired bale length.

The machine 200 includes a feed duct or chute 264 having an open forward end section 266, disposed for receiving crop from a pickup assembly 268. The chute 264 is curved upwardly and rearwardly from the forward end section to a near vertical rear end located for delivering crop through the baling chamber inlet 240. The pickup assembly 268 includes a rotary tine pickup 270, including a drive rotor or shaft, and a pair of augers 272 following the pickup 270 for centering crop to the width of the baling chamber 218.

The duct 264 defines a pre-compression chamber into which crop material delivered by the pickup assembly 268 is fed by a packer fork arrangement 274. Upon the material being compressed to a pre-selected density within the pre-compression chamber, a stuffer arrangement 276 engages a pre-compressed charge of crop material, sometimes called a flake or slice, and sweeps it from the pre-charge chamber and into the baling chamber 218, by way of the baling chamber inlet 240.

A retaining fork arrangement 280 includes a plurality of transversely spaced, hook-shaped retainer tines fixed at transversely spaced locations along a shaft of the arrangement 280. A density sensor, determines the density of the compressed crop. Once the compressed crop is determined to have a sufficient density, the retaining fork arrangement 280 moves from a retaining position to a release position, which allows the bale being formed to move toward the rear section 248.

The draft tongue 216 includes a drive connector 282 which is configured to drive the above described systems and subsystems for forming bales, tying bales, and moving the formed bales into and out of the baling chamber 218. The draft tongue 216 includes a removable housing 284 which provides a cover for a primary drive system. The drive connector 282 may be hydraulic, pneumatic, electric, mechanical, or the like and provide corresponding power to the baler 200.

Figure 3:
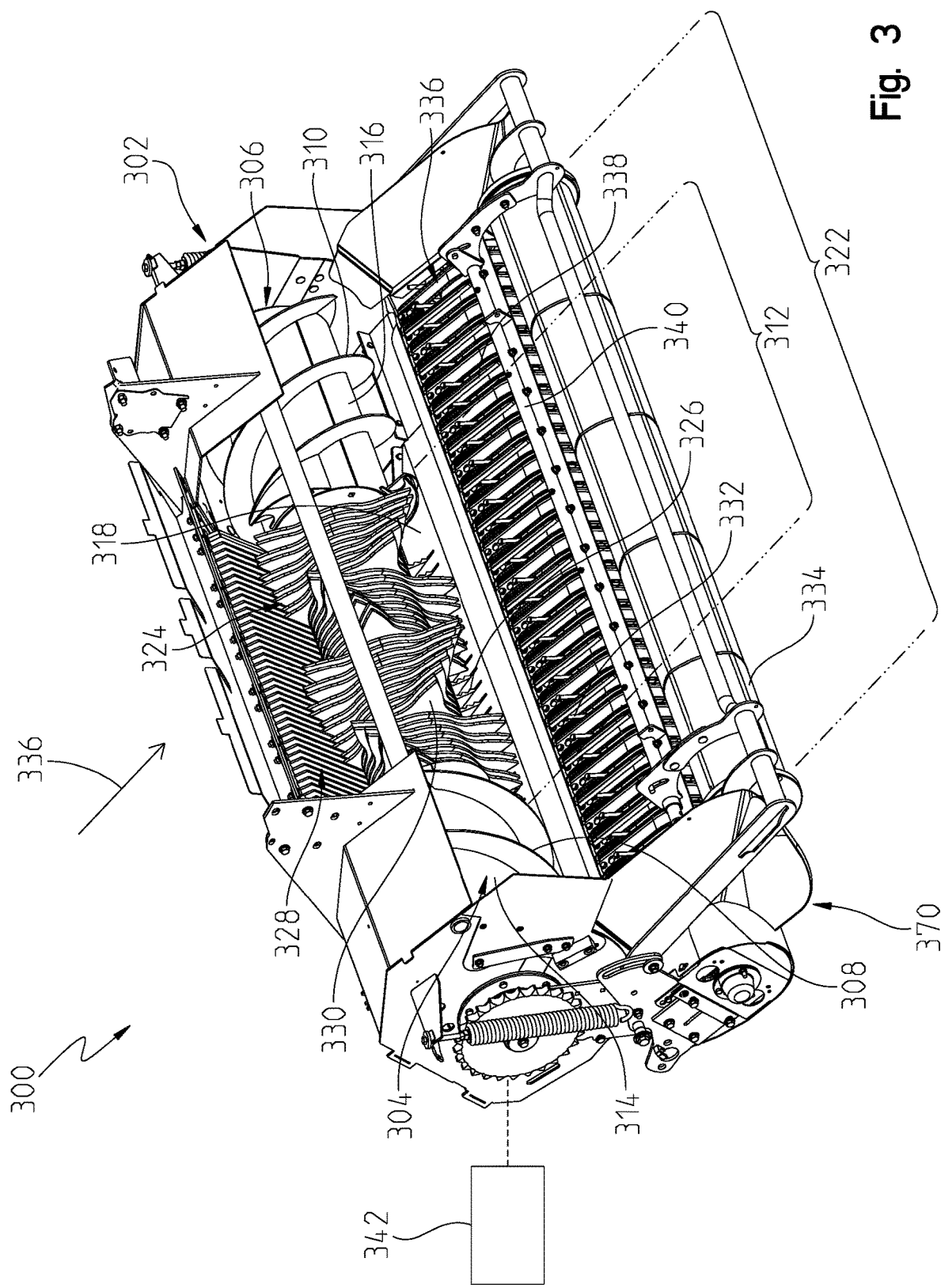
FIG. 3 is an elevated perspective view of a pickup assembly.

Referring now to FIG. 3, one example of a pickup assembly 300 of the present disclosure is illustrated. The pickup assembly 300 may be applied to either the round baler 100 or the rectangular baler 200, and this disclosure contemplates implementing the pickup assembly 300 on any type of baler or similar machine. The pickup assembly 300 may have a combination pre-cutter and transverse conveyor rotor assembly 302 which includes a pair of augers 304, 306 each supporting rotatable helically disposed bands or fighting 308, 310 for receiving wide swath crop from a rotary-tine pickup 370 and urging received crop toward a bale chamber region 312. The two augers 304, 306 are wound about corresponding auger cores 314, 316 in opposite senses so as to urge crop toward the bale chamber region 312 during rotation of the rotor assembly 302. A rotor floor 318 may partially surround the augers 304, 306 of the rotor assembly 302 to confine the received crop to generally axial motion toward the bale chamber region 312.

The bale chamber region 312 may be approximately the same width as any baling chamber or a pre-compression chamber and be sized to correspond therewith. However, a take-up width 322 may be the width of the pickup 370 and in some embodiments may be greater than the bale chamber region 312. In other words, the take-up width 322 may exceed the width of the bale chamber region 312 and baling chamber or pre-compression chamber.

The pickup 370 may be a rotary-tine pickup similar to the take-up device 132 or FIG. 1 and the rotary-tine pickup 270 of FIG. 2. More specifically, the pickup 370 may utilize tines 332 or the like to move crop from a swath on an underlying surface towards the rotor assembly 302. A pickup roller 334 may be positioned forward of the pickup 270 as the pickup assembly travels in a pickup direction 336. The pickup roller 334 may be rotationally coupled to brackets to rotate as the pickup 370 draws crop from the swaths towards the rotor assembly 302.

A rotor drive system 342 may be coupled to the rotor assembly 302 to provide rotary motion to the rotor assembly 302. The rotor drive system 342 may have an electric, hydraulic, pneumatic, mechanical, or the like system that provides torque to a gear, sprocket or the like assembly to thereby rotate the rotor assembly 302 at an operation speed among other things. In one aspect of this disclosure, the rotor drive system 342 may have a hydraulic or pneumatic motor that is driven by hydraulic or pneumatic fluid provided at a pressure from the work machine towing the pickup assembly 300. Similarly, the rotor drive system 342 may have an electric motor that is electrically coupled to the work machine towing the pickup assembly 300 to selectively provide electrical power thereto. Further still, the rotor drive system 342 may be mechanically driven by a power take-off or the like of the work machine towing the pickup assembly 300.

In one example of this disclosure, the pickup assembly 300 may not rely on a separate work machine to power the rotor assembly 302. For example, the rotor drive system 342 may be mechanically powered by a wheel rotationally coupled to the pickup assembly 300 that moves along the underlying surface as the pickup assembly 300 moves there along. Alternatively, the pickup assembly 300 may have a separate power source such as a battery, gas or diesel engine, or any other power generating or storing mechanism that can be coupled to the rotor drive system 342 to provide power thereto. Accordingly, any known method of powering the rotor drive system 342 is considered herein.

In one non-exclusive example a crop guide 336 may be spaced from an upper surface of the pickup 370 to guide the crop as the crop transitions from the pickup 370 towards the rotor assembly 302. The crop guide 336 may have a plurality of guide bars 338 that extend longitudinally from a transversely positioned guide bar cross member 340 towards the rotor assembly 302. The crop guide 336 assists the tines 332 of the pickup 370 by substantially preventing crop from flowing over the tines 332 as the pickup 370 moves the crop between the upper surface of the pickup 370 and the crop guide 336 towards the rotor assembly 302. Further still, in one aspect of this disclosure, the crop guide 338 and the pickup roller 334 may be pivotally coupled to a bracket of the pickup assembly 300. In this configuration, the crop guide 338 and roller 334 may pivot relative to the remaining portions of the pickup assembly 300 to process different sized swaths of crop and allow easy access to the rotor assembly 302.

Crop which has been lifted from the ground and passed over the pickup 370 as described herein is presented to the rotor assembly 302 which is configured as an undershot combination pre-cutter and transverse conveyor. The rotor assembly 302 may function to both transversely converge the crop to the bale chamber region 312 and to cut the crop as the crop is transitioned there through.

At least a portion of the bale chamber region 312 of the rotor assembly 302 may have one or more teeth 324 coupled thereto. Further, one or more cutting blades or knives 326 may be interleaved with the teeth 324 for cutting crop as it is processed towards the bale chamber or pre-compression chamber. Further, the knives 326 may be followed downstream by a set of strippers 328 also interleaved with the teeth 324 for urging cut crop away from the teeth 324 and towards the bale chamber or pre-compression chamber. The strippers 328 may take the form of a rake or comb-like assembly for dislodging crop from the teeth 324. The teeth 324 may be configured as a plurality of generally parallel plates each having a number of outwardly protruding crop engaging portions 330.

Figure 4A:
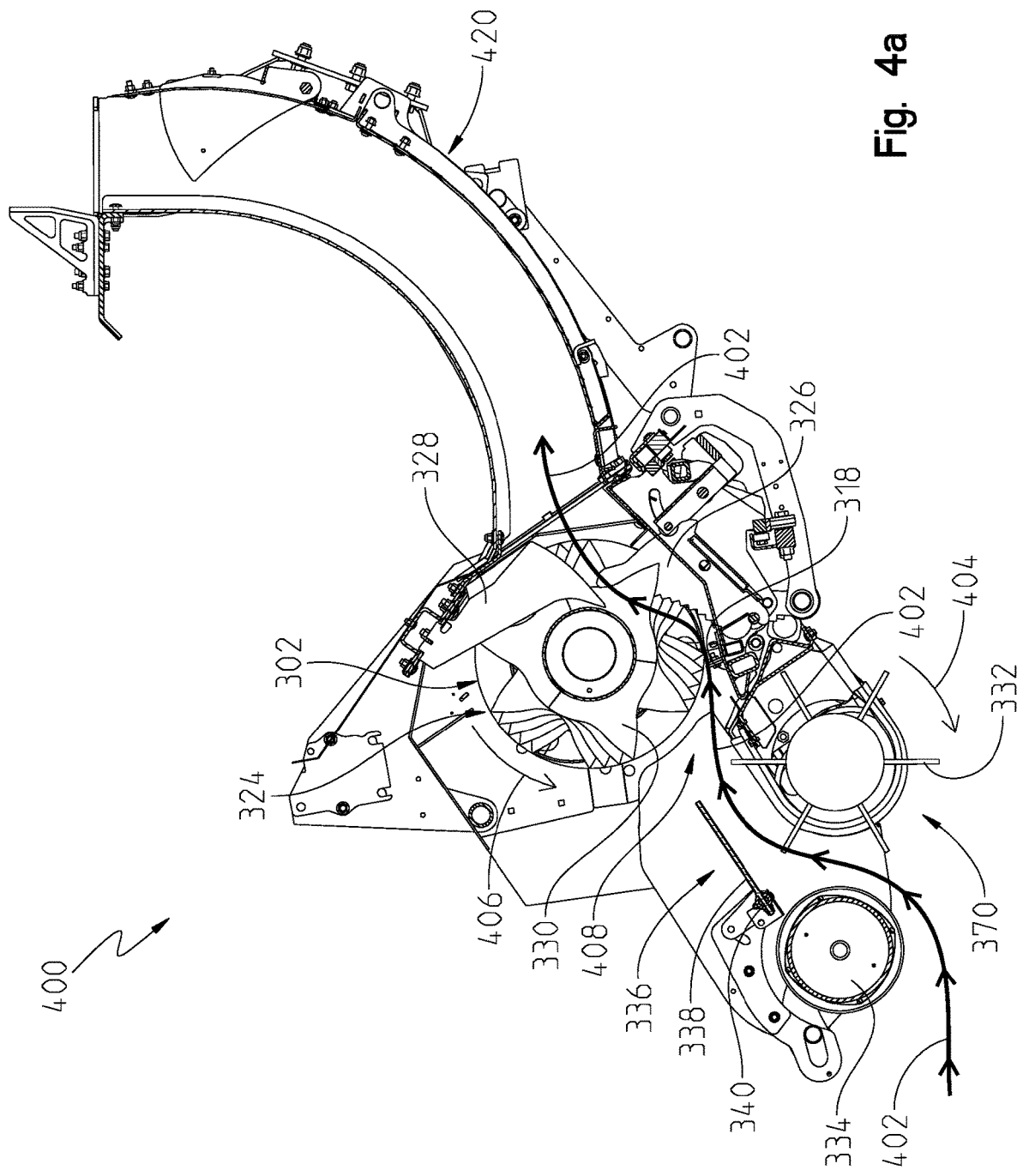
FIG. 4a is a section side view of the pickup assembly of FIG. 3 coupled to a pre-compression chamber of a rectangular baler.
Figure 4B:
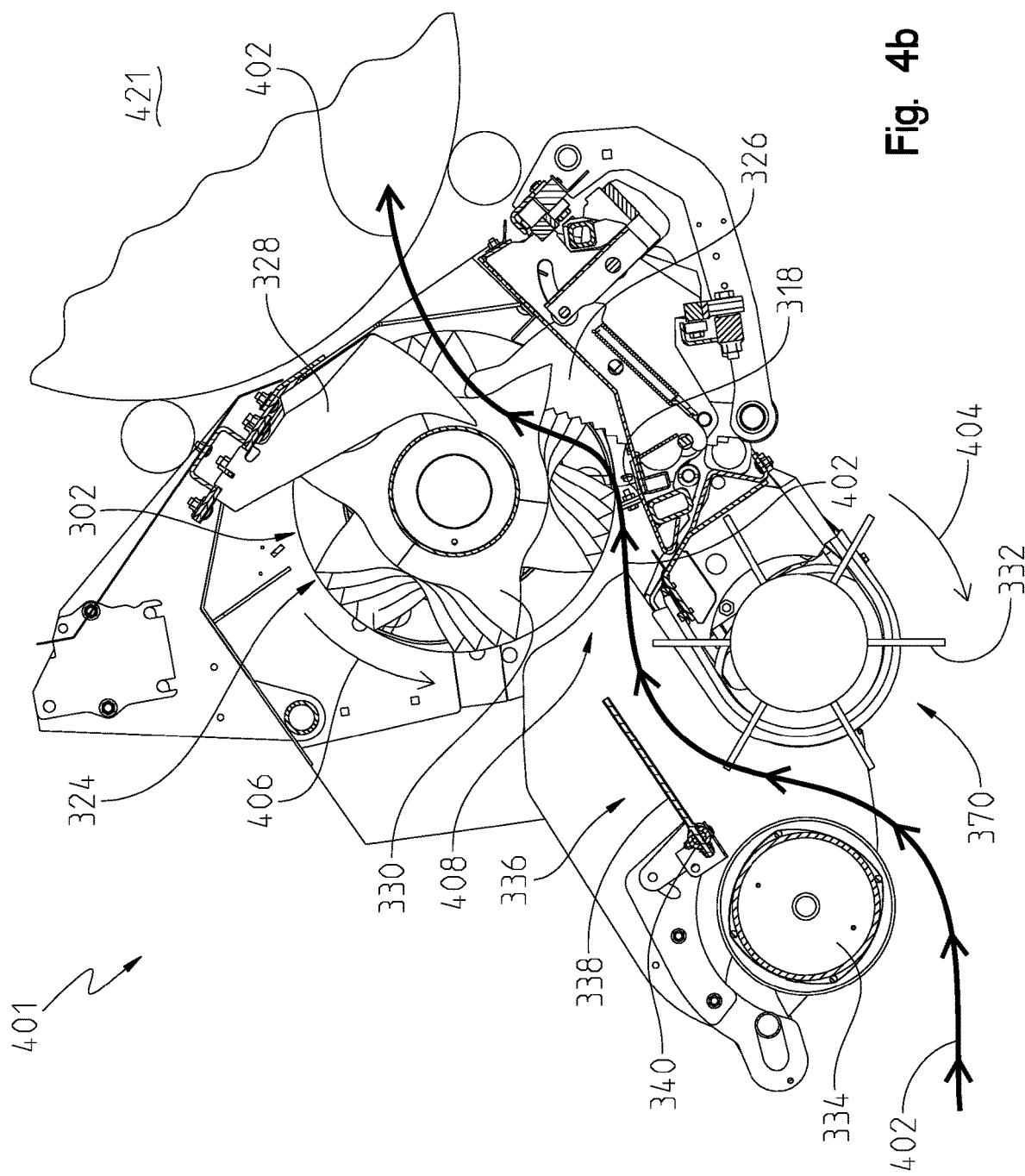
FIG. 4b is a section side view of the pickup assembly of FIG. 3 coupled to a baling chamber of a round baler.

Referring now to FIGS. 4a and 4b, a cross sectional view of the pickup assembly 300 is shown through a substantially central portion of the pickup assembly 300. FIG. 4a represents a partial view of a rectangular baler 400 with the pickup assembly 300 coupled thereto while FIG. 4b represents a partial view of a round baler 401 with the pickup assembly 300 coupled thereto. More specifically, illustrated in FIGS. 4a and 4b is an example crop flow path 402 for the pickup assembly 300. The crop flow 402 may begin under the pickup roller 334 where the crop sits on an underlying surface in a swath. As the crop approaches the rotary pickup 370, the tines 332 may be rotating about the rotary pickup 370 in a pickup direction 404 to urge the crop along the crop flow 402 between the pickup roller 334 and the rotary pickup 370. Then, the rotary pickup 370 may continue to urge the crop along the crop flow 402 between the rotary pickup 370 and the guide bars 338 of the crop guide 336.

The tines 332 may continue to move the crop along the crop flow 402 towards the rotor assembly 302. The rotor assembly 302 may rotate in an undershot direction 406 so a leading portion 408 of the rotor assembly 302 moves crop towards the rotor floor 318. Further, as the rotor assembly 302 rotates in the undershot direction 406, the teeth 324 may contact the crop and force the crop in the flow direction 402 between the rotor assembly 302 and the rotor floor 318 and into the cutter blades 326. As the crop is drawn in the flow direction 402 past the cutter blades 326, the crop may be cut into smaller segments for further processing by the baler. Further, as the crop passes the cutter blades 326, the strippers 328 may remove crop positioned between the teeth 324 to further promote movement of crop along the crop flow 402.

In FIG. 4a, the crop flow 402 leads into a pre-compression chamber 420 for further processing as is known in the art. However, this disclosure also contemplates the crop flow 402 leading directly into a baling chamber 421 of a round baler as well (see FIG. 4b). In the round baler configuration 401, there may be no pre-compression chamber 420 at all and the crop flow 402 may ultimately enter a baling chamber 421 for a round baler after being processed through the cutting blades 326. Furthermore, other embodiments of this disclosure may omit the cutting blades 326 entirely. Accordingly, the pickup assembly 300 described herein may be applied at least to both the round baler 401 and the rectangular baler 400.

Figure 5:
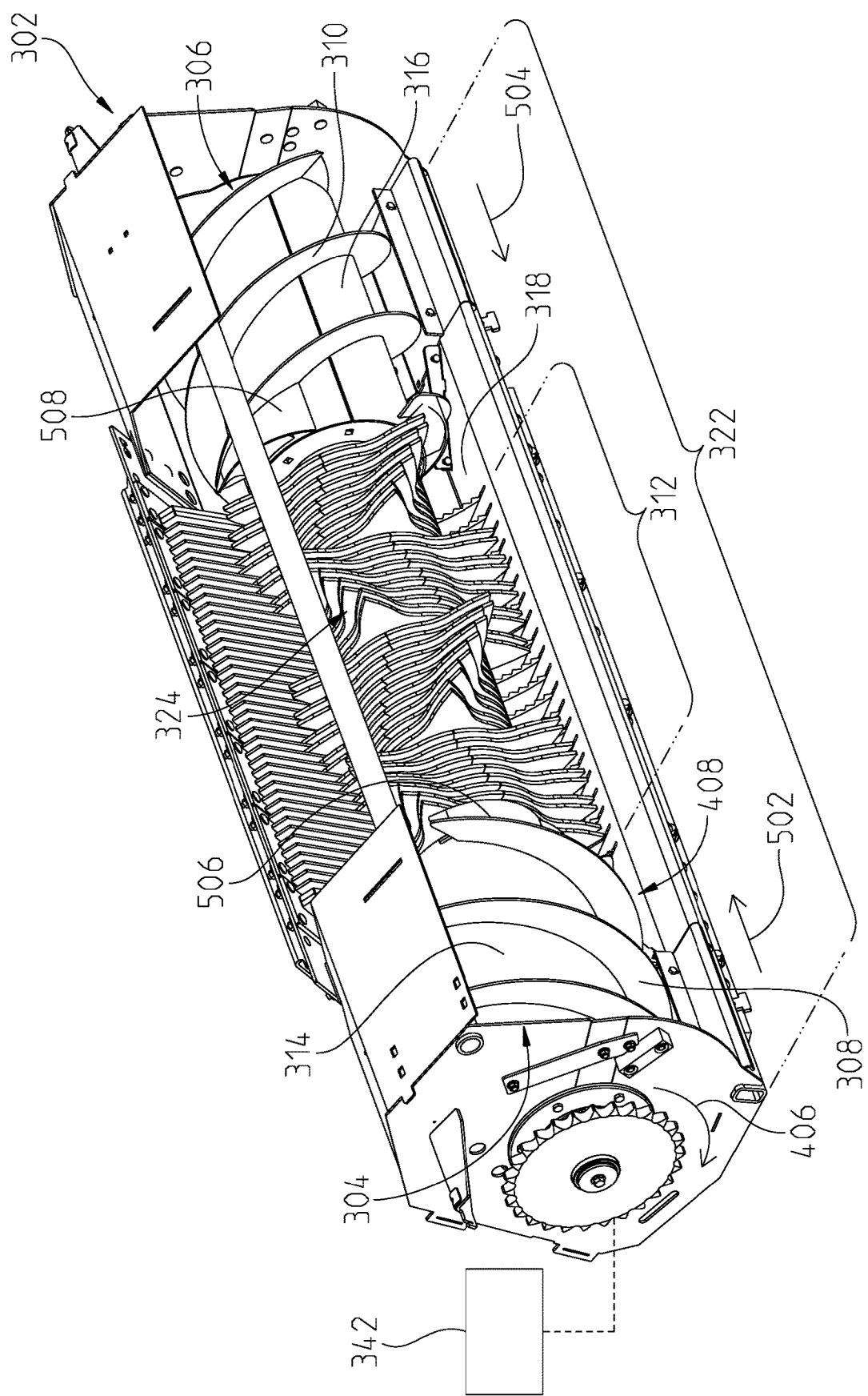
FIG. 5 is an elevated perspective view of a rotor assembly of the pickup assembly of FIG. 3.

Referring now to FIG. 5, an isolated view of the rotor assembly 302 is illustrated. As discussed herein, the rotor assembly 302 may have augers 304, 306 positioned on either end to move crop along the augers 304, 306 towards the bale chamber region 312. More specifically, the pickup 370 may have a take-up width 322, which is greater than the bale chamber region 312, to allow the baler to pick up and process crop formed in swaths wider than the bale chamber region 312. The widened take-up width 322 may allow the baler to process crop of a field into bales more quickly among other things by allowing the baler to take in crop in swath that is wider than the bale chamber region 312.

In one aspect of this disclosure, the flighting 308, 310 on the augers 304, 306 may be oriented to move crop towards the bale chamber region 312. Accordingly, the first auger 304 may orient the fighting 308 to move any crop positioned thereby in a first direction 502 towards the bale chamber region 312. Similarly, the second auger 306 may orient the flighting 310 to move any crop positioned thereby in a second direction 504 towards the bale chamber region 312. In one aspect of this disclosure, the fighting 308, 310 may be formed in a helical pattern around the respective auger cores 314, 316 and the first and second directions 502, 504 may be substantially opposite directions of one another. In this configuration, the helical orientation of the fighting on the first auger 304 may be substantially the opposite as the helical orientation of the fighting 310 on the second auger 306.

In one aspect of this disclosure, each auger 304, 306 may have a lift plate 506, 508 positioned along the portion of the respective auger 304, 306 that is adjacent to the bale chamber region 312. The lift plates 506, 508 may be extend radially away from the respective auger core 314, 316 as the lift plates 506, 508 are transitioned about the respective auger core 314, 316. In one non-exclusive example, the lift plates 506, 508 may be wedge-shaped members having an arcuate profile extending from the respective auger core 314, 316 to terminate at a radially outermost portion of the corresponding flighting 308, 310. The lift plates 506 may move crop material radially away from the respective auger core 314, 316 as the augers 304, 306 move the crop material in the corresponding first and second direction 502, 504.

Figure 6:
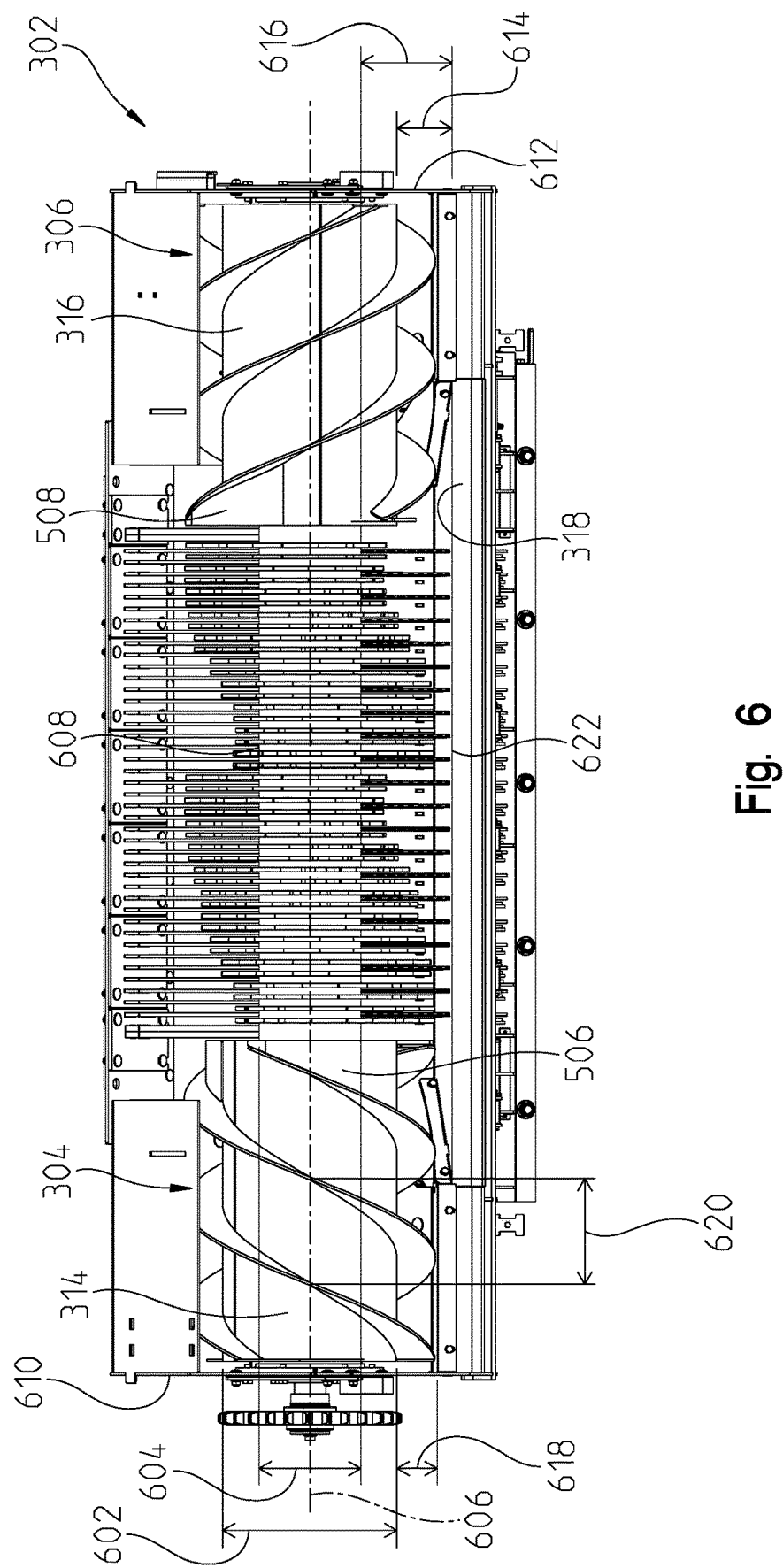
FIG. 6 is a front view of the rotor assembly of FIG. 5.

Referring now to FIG. 6, a front view of the rotor assembly 302 and rotor floor 318 is illustrated. More specifically, an auger core diameter 602 is illustrated among other things. The auger core diameter 602 may be the diameter measured from an outer surface of the auger core 314, 316 through a rotation axis 606 of the rotor assembly 302. Further the auger core diameter 602 may be substantially the same for both the first and second auger core 314, 316.

Also illustrated in FIG. 6 is a support tube 608. The support tube 608 may extend between a first and second side portion 610, 612 to rotationally couple the rotor assembly 302 to the remaining portions of the pickup assembly 300. Further, the support tube 608 may have a support tube diameter 604. The support tube diameter 604 may be the diameter of an outer surface of the support tube 608 through the rotation axis 606. In one aspect of this disclosure, the support tube diameter 604 is less than the auger core diameter 602. Further, the auger cores 314, 316 may be positioned around a portion of the support tube 608.

Also illustrated in FIG. 6 is an auger core choke distance 614. The auger core choke distance 614 may be the distance from an outer surface of the respective auger core 314, 316 to a floor plane 622 defined by the rotor floor 318 or other portion of the pickup assembly 300 that at least partially surrounds the rotor assembly 302. The floor plane 622 may be a plane that is substantially parallel to the rotation axis 606 but spaced therefrom. While the rotor floor 318 is described herein as establishing the floor plane 622, any portion of the pickup assembly 300 at least partially surrounding the auger core 314, 316 may be used to establish the floor plane 622. More specifically, the floor plane 622 maybe defined through any portion of the pickup assembly 300 at least partially surrounding an auger core 314, 316 and extending parallel to the rotation axis 606. In one aspect of this disclosure, the auger core choke distance 614 may affect the amount of crop that can become positioned between the auger core 314, 316 and the rotor floor 318.

Similarly, a support tube choke distance 616 is illustrated as the distance from an outer surface of the support tube 608 to the floor plane 622. The augers 304, 306 and the support tube 608 are rotationally coupled to the pickup assembly 300 about the rotation axis 606. Accordingly, the auger core choke distance 614 and the support tube choke distance 616 may be a consequence of the auger core diameter 602 and the support tube diameter 604. In other words, increasing the support tube diameter 604 would decrease the support tube choke distance 616. Similarly, increasing the auger core diameter 602 would decrease the auger core choke distance 614.

While the auger core choke distance 614 and the support tube choke distance 616 are described relative to the floor plane 622 of the rotor floor 318, this disclosure contemplates using other portions of the rotor assembly 302 and surrounding structure to determine the choke distances 614, 616 as well. More specifically, any portion of the pickup assembly 300 that at least partially surrounds the rotor assembly 302 and is radially spaced from the auger cores 314, 316 may be used to establish the floor plane 622 and corresponding choke distances 614, 616. For example, a rotor assembly surround may be positioned partially around the rotor assembly 302 and the choke distances 614, 616, may be determined based on a plane defined by the rotor assembly surround. Accordingly, the choke distances 614, 616 may be determined based on any portion of the pickup assembly 300 that at least partially surrounds the rotor assembly 302.

A fighting distance 618 is also illustrated in FIG. 6. The flighting distance 618 may be the distance at which the flighting extends radially away from the corresponding auger core 314, 316. In one aspect of this disclosure, the flighting distance 618 may be slightly less than the auger core choke distance 614. In this configuration, the fighting 308, 310 may contact any crop positioned thereby to move the crop in the corresponding first or second direction 502, 504 without the flighting 308, 310 substantially contacting the rotor floor 318 or other surrounding portions of the pickup assembly 300. In one aspect of this disclosure, the flighting distance 618 is almost the same as the auger core choke distance 614. Alternatively, the fighting distance 618 may be about half the auger core choke distance 614. Further still, in another embodiment the fighting distance 618 is less than half of the auger core choke distance 614.

The fighting 308, 310 may also have a pitch 620. In one aspect of this disclosure, the fighting 308, 310 may be three separate helical portions extending from the corresponding auger core 314, 316. In this configuration, the pitch 620 may be the distance between successive corresponding points of the corresponding fighting 308, 310 along an axis parallel to the rotation axis 606.

Figure 7:
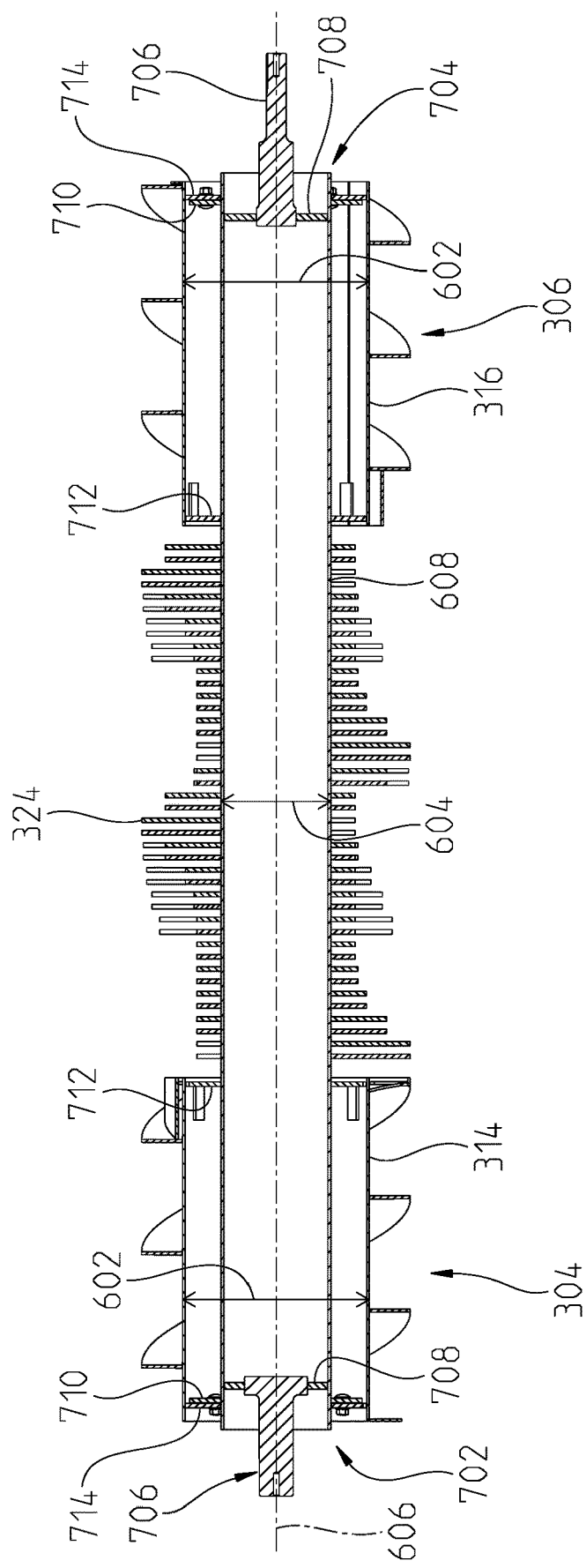
FIG. 7 is a section view of a portion of the rotor assembly of FIG. 5.

Referring now to FIG. 7, a section view of the rotor assembly 302 is illustrated. The auger core 316 may extend between a first end 702 and a second end 704. Further, a mounting shaft 706 or the like may be coupled to the auger core 316 at each of the first and second ends 702, 704 to thereby rotationally couple the rotor assembly 302 to the pickup assembly 300 along the rotation axis 606. In one aspect of this disclosure, the mounting shaft 706 on either or both ends 702, 704 may be rotationally coupled to the rotor drive system 342 to thereby drive the rotor assembly 302 at a predetermined rotation speed.

The mounting shafts 706 may be coupled directly to the support tube 608 or coupled thereto with shaft spacers 708. The shaft spacers 708 may allow the mounting shafts 706 to have a diameter that is less than the support tube diameter 604. More specifically, the shaft spacers 708 may be radial spacers that rotationally couple the mounting shafts 706 to the support tube 608.

The first and second augers 304, 306 may be positioned at least partially around the support tube 608. Further, in one non-exclusive example the augers 304, 306 may be removably coupled to the support tube 608 with an auger coupler spacer 710 and an auger spacer 712. Both the auger coupler spacer 710 and the auger spacer 712 may be radial spacers that extend from a radially outer portion of the support tube 608 to a radially inner portion of the corresponding auger core 314, 316. In one aspect of this disclosure, the auger cores 314, 316 may have a coupler portion 714 extending radially inward from the inner surface of the auger core 314, 316 at a location that is adjacent to the corresponding auger coupler spacer 710. In this configuration, a fastener or the like may be utilized to couple the coupler portion 714 of the corresponding auger core 314, 316 to the corresponding auger coupler spacer 710 to thereby substantially restrict the auger cores 314, 316 from moving axially about the rotation axis 606 relative to the support tube 608.

In one aspect of this disclosure, each auger 304, 306 may be removably coupled to the support tube 608 via the corresponding auger coupler spacer 710 and auger spacer 712. More specifically, to couple the auger 304, 306 to the support tube 608 the auger 304, 306 may be radially aligned with the rotation axis 606. Next, the portion of the auger 304, 306 distal to the coupler portion 714 may be positioned over the auger coupler spacer 710 and the auger 304, 306 may be moved axially along the rotation axis 606 towards the teeth 324. The distal portion of the auger 304, 306 may then be positioned over the auger spacer 712 as the coupler portion 714 becomes positioned adjacent to the auger coupler spacer 710. Then, a fastener or the like may couple the auger 304, 306 to the support tube 608 by coupling the auger portion 714 to the auger coupler spacer 710.

In one aspect of this disclosure, each auger 304, 306 may only be coupled to the support tube 608 at the coupler portion 714. In this configuration, the auger spacer 712 maintains radial alignment between the corresponding auger 304, 306 and the support tube 608 but does not restrict axial movement there between. However, the coupler portion 714 and the auger coupler spacer 710 may substantially restrict axial movement of the corresponding auger 304, 306 along the rotation axis 606 relative to the support tube 608 when the coupler portion 714 is coupled to the auger coupler spacer 710. Accordingly, the respective augers 304, 306 may be uncoupled from the corresponding auger coupler spacer 710 and slid away from the support tube 608.

While a particular coupling method is described herein, other coupling methods between the augers 304, 306 and the support tube 608 are also contemplated. More specifically, the augers 304, 306 may be welded to the support tube at one or both of the auger coupler spacer 710 and the auger spacer 712. Further, in one embodiment the augers 304, 306 are only coupled to the support tube 608 at the auger spacer 712 and not at the auger spacer coupler 710. Accordingly, any known coupling configuration is contemplated herein.

In one aspect of this disclosure, the auger core diameter 602 and corresponding auger core choke distance 614 may be sized to correspond with the pitch 620 of the flighting 308, 310 and the rotation speed of the rotor drive system 342 to quickly and efficiently move crop in the corresponding first or second direction 502, 504 while minimizing the likelihood of crop becoming clogged between the augers 304, 306 and the rotor floor 318 or the like. In one aspect of this disclosure, creating the auger core choke distance 614 that is greater than the support tube choke distance 616 reduces the likelihood of crop clogging along the augers 304, 306 while allowing crop to quickly be positioned along the bale chamber region 312 to be processed there through. In other words, while reducing the auger core choke distance 614 may improve crop flow in the corresponding first and second directions 502, 504 and reduce crop clogging along the augers 304, 306, the support tube choke distance 616 may need to be larger than the auger core choke distance 614 to allow sufficient volumes of crop to be processed into the corresponding chamber 420, 421 by the teeth 324.

While the bale chamber region 312 is shown and described herein along a substantially central portion of the pickup assembly 300, this disclosure also considers offsetting the bale chamber region 312 to either side of the pickup assembly 300. In this configuration, one auger 304, 306 may be longer than the other auger 304, 306 to move crop towards the offset bale chamber region. Further still, one embodiment considered herein may have only one auger that moves crop towards the bale chamber region. Accordingly, this disclosure contemplates locating the bale chamber region 312 along any portion of the pickup assembly 300 and providing one or more auger having a width that correspond with the location of the bale chamber region 312 as described herein.

In one non-exclusive example, the auger core choke distance 614 may be less than about 170 millimeters. Further, the auger core choke distance 614 may be about 105 millimeters in another non-exclusive example. In yet another non-exclusive example, the auger core choke distance 614 may be about 80 millimeters. Further still, other embodiments may have an auger core choke distance 614 of any distance between 105 and 80 millimeters. In yet another example, the auger core choke distance 614 is less than 80 millimeters. Accordingly, this disclosure considers utilizing any auger core choke distance 614 that is less than the support tube choke distance 616.

In one non-exclusive example, the rotor drive system 342 may rotate the rotor assembly 302 at an operation speed that corresponds with the pitch 620 and the auger core choke distance 614 to minimizing plugging or clogging of crop in the augers 304, 306 and quickly move crop positioned by the augers 304, 306 towards the bale chamber region 312 and into the corresponding chamber 420, 421. More specifically, in one example the rotor assembly 302 rotates at an operation speed of about 180 revolutions per minute (RPM). This operation speed may correspond with a pitch 620 of about 600 millimeters and an auger core choke distance 614 of about 105 millimeters. In this configuration, the rotor assembly 302 may effectively move crop from the augers 304, 306 towards the bale chamber region 312 while minimizing clogging.

While an operation speed of 180 RPM is discussed herein, this disclosure considers operation speeds greater than 180 RPM as well. Further still, in at least one embodiment of the present disclosure the operation speed may be less than 180 RPM. Accordingly, this disclosure contemplates implementing any operation speed with the rotor drive system 342 that is appropriate for the pitch 620 and auger core choke distance 614, among other things, of the rotor assembly 302. Further still, in another aspect of this disclosure the operation speed may be variable and the rotor drive system 342 may selectively apply an operation speed that varies from speeds greater than 180 RPM to speeds less than 180 RPM.

The pitch 620 may be any pitch that provides proper flow of crop towards the bale chamber region 312. Accordingly, one embodiment may implement a pitch 620 that is greater than 600 millimeters. A different embodiment may implement a pitch 620 that is less than 600 millimeters. The pitch 620 may correspond with the operation speed of the rotor drive system 342 and the auger core choke distance 614 to move crop towards the bale chamber region 312 to evenly distribute the crop therein. More specifically, the pitch 620 and operation speed may be such that crop is quickly moved to the bale chamber region 312 without being unevenly distributed within the bale chamber region 312.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A rotor assembly, comprising:
a support tube having a first outer diameter;
at least one tooth coupled to the support tube, wherein the tooth rotates with the support tube to direct crop toward a chamber;
an undershot auger having a rotation direction that is opposite a pickup rotation direction, the undershot auger comprising an auger flight extending radially away from an auger core, the auger flight configured to cause the crop to flow towards a bale chamber region of the rotor assembly when rotation of the rotor assembly causes the crop to flow under the rotor assembly; and
a coupler portion extending inwardly from an inner surface of the auger core;
wherein, the auger core has an inner diameter that is greater than the first outer diameter to radially space the auger core from the support tube and the auger core is removably coupled around a portion of the support tube with an auger coupler spacer to rotate with the support tube;
wherein the coupler portion is coupled to the auger coupler spacer of the support tube to couple the auger core to the support tube.

2. The rotor assembly of claim 1, further comprising:
a rotor floor defining a floor plane;
a first choke distance defined between the floor plane and the auger core; and
a second choke distance defined between the support tube and the floor plane;
wherein, the first choke distance is less than the second choke distance.

3. The rotor assembly of claim 1, further wherein the auger has a lifter plate extending from the auger core.

4. A crop management system for an agricultural work machine, comprising:
a rotor assembly having a first auger coupled to a support tube and configured to rotate about a rotation axis;
a plurality of teeth coupled directly to the support tube along a bale chamber region;
a rotor floor positioned along a portion of the rotor assembly;

a first auger core of the first auger removably coupled to the support tube; and a coupler portion extending inwardly from an inner surface of the first auger core;

wherein, the rotor assembly rotates in an undershot direction wherein a leading portion of the rotor assembly is rotating partially toward the rotor floor to direct and compress crop between the rotor assembly and the rotor floor;

further wherein, an auger choke distance is defined as a distance between the first auger core and a floor plane, the floor plane being parallel to the rotation axis;

further wherein, a support tube distance is defined between the support tube and the floor plane and the auger choke distance is less than the support tube distance;

further wherein, the auger core is coupled about the support tube in a radially spaced configuration with an auger coupler spacer, wherein the auger coupler spacer radially and axially aligns the auger core with the support tube and couples the auger core to rotate with the support tube wherein the coupler portion is coupled to the auger coupler spacer of the support tube to couple the auger core to the support tube.

5. The crop management system of claim 4, further comprising second auger having a second auger core that is spaced the auger choke distance from the floor plane.

6. The crop management system of claim 5, further wherein both the first and second auger have flighting extending from the corresponding auger core to reposition crop towards the bale chamber region.

7. The crop management system of claim 5, further wherein the first and second augers each have a lifter plate extending from the corresponding auger core.

8. The crop management system of claim 4, further wherein, the first auger core has a radially inner diameter that is greater than a support tube outer diameter of the support tube.

9. The crop management system of claim 4, further comprising an auger spacer positioned between the auger core and the support tube, wherein the auger spacer maintains radial orientation of the auger core relative to the support tube but is not coupled to the auger core.

10. A method for processing crop in a baler assembly, comprising:

providing at least one auger assembly comprising an auger core, a support tube assembly, a teeth arrangement, a rotor floor, a crop pickup, and a rotor drive system;

coupling the teeth arrangement to the support tube assembly along a bale chamber region;

coupling the at least one auger assembly to the support tube with an auger coupler spacer in a radially spaced configuration to selectively rotate the auger assembly about a rotation axis with the support tube wherein a coupler portion extends inwardly from an inner surface of the auger core and the coupler portion is coupled to the auger coupler spacer of the support tube to couple the auger core to the support tube;

positioning the support tube so the at least one auger assembly is an auger choke distance from a floor plane of the rotor floor, the floor plane being parallel to the rotation axis, and the support tube is a support tube choke distance from the floor plane, the support tube choke distance being greater than the auger choke distance; and coupling the support tube to the rotor drive system to selectively rotate the support tube, at least one auger, and teeth arrangement at an operation speed in an undershot direction;

wherein, the at least one auger assembly has flighting at a pitch there around.

11. The method for processing crop in a baler assembly from claim 10, further wherein the coupling the at least one auger assembly step includes positioning the at least one auger at least partially around the support tube.

12. The method for processing crop in a baler assembly from claim 10, further comprising positioning the support tube and at least one auger adjacent to the crop pickup, wherein the crop pickup moves a crop material from an underlying surface along a crop flow path that leads between the support tube and the rotor floor.

13. The method for processing crop in a baler assembly from claim 12, further wherein the crop flow path leads to a bale chamber of a round baler.

14. The method for processing crop in a baler assembly from claim 12, further wherein the crop flow path leads to a pre-compression chamber of a rectangular baler.

* * * * *